United States Patent
Wei et al.

(10) Patent No.: US 9,886,969 B2
(45) Date of Patent: Feb. 6, 2018

(54) GRAMOPHONE RECORD

(71) Applicant: ULVAC TAIWAN INC., Hsinchu (TW)

(72) Inventors: Yun-Hsiang Wei, Hsinchu (TW); Chiang-Yao Chen, Hsinchu (TW); Tung-Jung Wu, Hsinchu (TW); Li-Yen Chen, Hsinchu (TW)

(73) Assignee: ULVAC TAIWAN INC., Hsinchu (TW)

( * ) Notice: Subject to any disclaimer, the term of this patent is extended or adjusted under 35 U.S.C. 154(b) by 0 days.

(21) Appl. No.: 15/077,047

(22) Filed: Mar. 22, 2016

(65) Prior Publication Data

US 2016/0322069 A1 Nov. 3, 2016

(30) Foreign Application Priority Data

Apr. 29, 2015 (TW) .............................. 104113753 A

(51) Int. Cl.
*G11B 3/70* (2006.01)
*G11B 3/68* (2006.01)

(52) U.S. Cl.
CPC ................ *G11B 3/70* (2013.01); *G11B 3/682* (2013.01)

(58) Field of Classification Search
CPC .. G11B 3/70; G11B 3/682; G11B 5/72; G11B 7/2532; B32B 2429/02; B32B 2311/02; B32B 2311/22
See application file for complete search history.

(56) References Cited

U.S. PATENT DOCUMENTS

| | | | | |
|---|---|---|---|---|
| 1,859,396 A | * | 5/1932 | Jager ........................ | G11B 3/70 29/DIG. 28 |
| 2,505,787 A | * | 5/1950 | Munkacsi ................ | G11B 3/70 283/117 |
| 4,363,844 A | * | 12/1982 | Lewis ...................... | G11B 7/26 156/244.24 |
| 4,440,604 A | * | 4/1984 | Morris, Jr. ............... | C25D 1/10 205/68 |

* cited by examiner

*Primary Examiner* — Catherine A Simone
(74) *Attorney, Agent, or Firm* — Burris Law, PLLC

(57) ABSTRACT

A gramophone record includes a main body and a cladding layer. The main body is made of a polymeric material, and has a base surface and an extending surface which extends downward from the base surface. The extending surface defines a continuous spiral groove in the main body. The cladding layer is formed on the extending surface, and has a Hardness Rockwell C (HRC) of not less than 37.

14 Claims, 1 Drawing Sheet

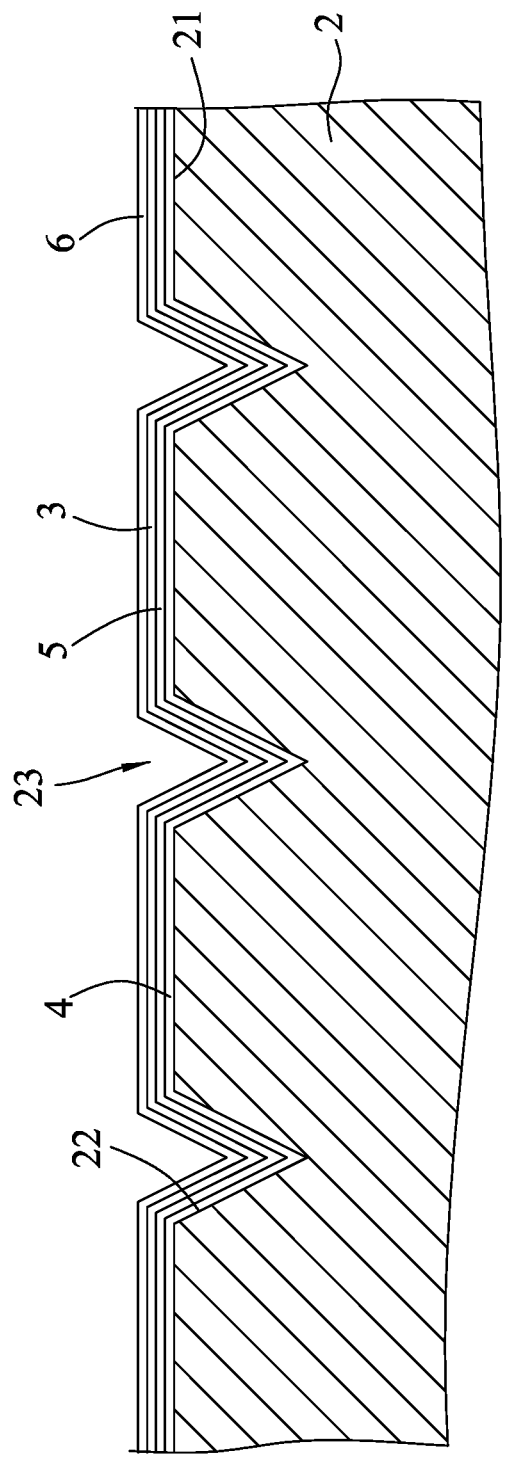

GRAMOPHONE RECORD

CROSS-REFERENCE TO RELATED APPLICATION

This application claims priority of Taiwanese Patent Application No. 104113753, filed on Apr. 29, 2015.

FIELD

The disclosure relates to a gramophone record, more particularly to a gramophone record that is easy to maintain and that exhibits superior wear-resistant and antistatic properties.

BACKGROUND

A gramophone record is a black, disc-shaped film, originally used as a sound storage and recording medium. Its unique appearance and audio quality are reasons for why it remains popular among certain collectors, and has a steady demand in the market.

The gramophone record is mainly made of polyvinyl chloride (PVC), a polymer material, which undergoes pressing to forma continuous groove with a spiral shape on a surface of the gramophone record. A gramophone stylus moves along and reads the spiral groove to generate a signal, after which a coil within a gramophone pickup transmits the signal to produce sound.

In general, it is not easy to maintain and preserve the gramophone records. The gramophone record must be stored in dry, ventilated areas to prevent mold growth, and frequently cleaned to reduce the collection of dust or contaminants in the spiral groove.

Another problem associated with the conventional gramophone record is that a trace of static electricity may be generated when the stylus rubs against the gramophone record during playback, causing undesired playback noise. Upon buildup of a large amount of electric charge, a loud "pop" sound may occur, and severely affect playback quality. For these reasons, a common solution is to use an anti-static brush to eliminate the static electricity on the gramophone record.

However, because the gramophone record is made of PVC, use of the anti-static brush to remove dust or contaminants from the spiral groove or static electricity on the gramophone record may result in wear and tear or scratches on the gramophone record. Over time, this practice may result in impaired playback quality or even deformation of the record gramophone.

Furthermore, due to poor heat dissipation associated with the PVC, the heat energy generated from rubbing of the stylus against the gramophone record cannot be quickly dispelled, and continuous record playback would be difficult. Consequently, the heat energy would result in wear and tear or deformation of the spiral groove, leading to a shortened lifespan of the gramophone record.

SUMMARY

Therefore, an object of the present disclosure is to provide a gramophone record that can alleviate at least one of the aforementioned drawbacks associated with the conventional gramophone record.

Accordingly, a gramophone record of the present disclosure includes a main body and a cladding layer. The main body is made of a polymeric material, and has a base surface and an extending surface which extends downwards from the base surface to define a continuous spiral groove. The cladding layer is formed on the extending surface, and has a Hardness Rockwell C (HRC) of not less than 37.

BRIEF DESCRIPTION OF THE DRAWINGS

Other features and advantages of the present disclosure will become apparent in the following detailed description of the embodiment with reference to the accompanying drawing, of which:

FIG. 1 is a schematic sectional view illustrating an embodiment of the gramophone record according to the present disclosure.

DETAILED DESCRIPTION

Referring to FIG. 1, an embodiment of a gramophone record according to the present disclosure includes a main body 2, a cladding layer 3, a buffer layer 4, a conductive layer 5, and a protective layer 6.

The main body 2 has abase surface 21, and an extending surface 22 extending downward from the base surface 21. The extending surface 22 defines a continuous spiral groove 23 in the main body 2 of the gramophone record 1. The main body 2 is made of a polymeric material, e.g., polyvinyl chloride (PVC), polycarbonate (PC), polyetheretherketone (PEEK), polyimide (PI), polyoxymethylene (POM), or combinations thereof.

The cladding layer 3, which has a Hardness Rockwell C (HRC) of not less than 37, is formed on at least a portion of the record surface, e.g., the extending surface 22, and has wear-resistant properties. The cladding layer 3 may have a heat transfer coefficient of not less than 0.5 W/m° C., and a static friction coefficient of not greater than 1, using stainless steel as a reference surface.

It should be noted that the cladding layer 3 serves to prevent the main body 2, and particularly, the spiral groove 23, from wear and tear or scratches by foreign objects, thus maintaining the quality of the gramophone record.

The cladding layer 3 may be formed via sputtering, thermal evaporation, e-beam evaporation, electroplating, sol gel techniques, etc. Taking into consideration the conditions of manufacturing and ease of operation, the cladding layer 3 can be formed on not only the extending surface 22, but also the base surface 21. In this embodiment, the cladding layer is formed on both the base surface 21 and the extending surface 22.

The cladding layer 3 has a thickness between 3 nm and 1000 nm, and may be made of a material with a high degree of hardness, e.g., diamond-like carbon, boron nitride, silicon nitride, silicon carbide, tungsten carbide, titanium carbide, molybdenum disulfide, or silicon dioxide.

Furthermore, it should be noted that the cladding layer 3 has a Young's modulus between 1.05 and 3 times that of the main body 2. By adjusting the Young's modulus of the main body 2 and the Young's modulus of the cladding layer 3, the extent of deformation of the gramophone record that occurs when a stylus presses against the spiral groove 23 can be controlled. In this way, the level of sound distortion caused by deformation of the spiral groove 23 can be minimized to achieve enhanced playback quality.

The buffer layer 4 has a thickness between 1 nm and 100 nm, and is formed between the main body 2 and the cladding layer 3. The buffer layer 4 is made from a material, e.g., nickel, vanadium, molybdenum, chromium, silicon, combinations thereof, alloys thereof, oxides thereof, or nitrides thereof.

Since the cladding layer 3 is composed of a non-polymeric material, and formed on the polymeric material of the main body 2, compatibility issues may arise between the two materials and cause the cladding layer 3 to be detached from the main body 2. Thus, the purpose of the buffer layer 4 is to increase adhesion between the cladding layer 3 and the main body 2. In other words, if the material of the cladding layer 3 has good compatibility with the material of the main body 2, the buffer layer 4 may be dispensed with.

The conductive layer 5 has a thickness between 3 nm and 100 nm, and is formed between the buffer layer 4 and the cladding layer 3. The conductive layer 5 is made of a material, e.g., nickel, vanadium, titanium, molybdenum, chromium, copper, aluminum, gold, silver, platinum, or combinations thereof, with the proviso that the material of the conductive layer 5 is different from that of the buffer layer 4.

It is worth mentioning that inclusion of the conductive layer 5 may or may not be required depending on the material of the cladding layer 3. Specifically, inclusion of the conductive layer 5 may not be needed when the cladding layer 3 is made from a conductive material. The conductive material may include a metal material, an alloy, a metal oxide, a metal nitride, and a metal carbide. The metal material may be, e.g., nickel, vanadium, titanium, molybdenum, chromium, tungsten, tantalum, aluminum, or combinations thereof. The alloy is an alloy of a metal. The metal has an atomic percentage in the alloy being less than 50% and may be, e.g., nickel, vanadium, titanium, molybdenum, chromium, tungsten, tantalum, aluminum, or combinations thereof. The metal oxide may be, e.g., indium oxide, tin oxide, zinc oxide, nickel oxide, vanadium oxide, titanium oxide, chromium oxide, tungsten oxide, tantalum oxide, aluminum oxide, or combinations thereof. The metal nitride may be, e.g., nickel nitride, vanadium nitride, titanium nitride, chromium nitride, tungsten nitride, tantalum nitride, aluminum nitride, or combinations thereof. The metal carbide may be, e.g., nickel carbide, vanadium carbide, titanium carbide, chromium carbide, tungsten carbide, tantalum carbide, aluminum carbide, or combinations thereof.

In these cases where the cladding layer 3 is made of the conductive material, the cladding layer 3 with desired hardness and conductivity can be used to protect the spiral groove 23 and provide the gramophone record with wear-resistant and anti-static properties.

Furthermore, the cladding layer 3 has good heat conductivity, and can effectively dispel thermal energy generated when the stylus rubs against the spiral groove 23. By preventing the accumulation of heat during continuous playback, the cladding layer 3 can effectively reduce heat damage or deformation of the spiral groove 23, and enhance the lifespan of the gramophone record. Moreover, since the cladding layer 3 has a static friction coefficient of not greater than 1, the friction can be effectively reduced during playback, contributing to an increased lifespan of the gramophone record.

The protective layer 6 has a thickness between 0.5 nm and 100 nm, and is formed on the surface of the cladding layer 3 and opposite to the main body 2. Preferably, the protective layer 6 is made of a fluorine-containing compound or silicon dioxide nanoparticles. The material of the protective layer 6 has low surface energy which helps to enhance the hydrophobic and oleophobic properties of the protective layer 6, so that it can be resistant to dirt and fingerprints, and require little cleaning effort. Additionally, the protective layer 6 may also be made of a metal with disinfectant properties, so as to reduce the growth of microorganisms on the gramophone record.

In summary, the cladding layer 3, the conductive layer 5, and the protective layer 6 allow the gramophone record to be wear-resistant, anti-microbial, anti-fouling, and antistatic. Ease of maintenance and storage, and the enhanced playback quality of the gramophone record effectively contribute to upholding the quality and value of the gramophone record of the present disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A gramophone record, comprising:
    a main body made of a polymeric material, and having a base surface, and an extending surface extending downward from said base surface, said extending surface defining a spiral groove in said main body;
    a cladding layer formed on said extending surface and having a Hardness Rockwell C (HRC) of not less than 37; and
    a buffer layer formed between said main body and said cladding layer, said buffer layer being made from a material selected from the group consisting of a metal material, an alloy of said metal material, an oxide of said metal material, and a nitride of said metal material, silicon, silicon alloy, silicon oxide, and silicon nitride,
    wherein said metal material is selected from the group consisting of vanadium, molybdenum, and chromium.

2. The gramophone record as claimed in claim 1, wherein said cladding layer is formed on said base surface and said extending surface.

3. The gramophone record as claimed in claim 2, wherein said cladding layer has a heat transfer coefficient of not less than 0.5 W/m° C.

4. The gramophone record as claimed in claim 2, wherein
    said cladding layer is made of a material selected from the group consisting of a metal material, an alloy, a metal oxide, a metal nitride, and a metal carbide,
    said metal material is selected from the group consisting of nickel, vanadium, titanium, molybdenum, chromium, tungsten, tantalum, aluminum, and combinations thereof,
    said alloy is an alloy of a metal selected from the group consisting of nickel, vanadium, titanium, molybdenum, chromium, tungsten, tantalum, and aluminum,
    said metal oxide is selected from the group consisting of indium oxide, tin oxide, zinc oxide, nickel oxide, vanadium oxide, titanium oxide, chromium oxide, tungsten oxide, tantalum oxide, and aluminum oxide,
    said metal nitride is selected from the group consisting of nickel nitride, vanadium nitride, titanium nitride, chromium nitride, tungsten nitride, tantalum nitride, and aluminum nitride, and
    said metal carbide is selected from the group consisting of nickel carbide, vanadium carbide, titanium carbide, chromium carbide, tungsten carbide, tantalum carbide, and aluminum carbide.

5. The gramophone record as claimed in claim 4, wherein said cladding layer is made of said alloy, and the atomic percentage of said metal present in said alloy is not less than 50%.

6. The gramophone record as claimed in claim 2, wherein said cladding layer is made of a material selected from the group consisting of diamond-like carbon, boron nitride, silicon nitride, silicon carbide, tungsten carbide, titanium carbide, molybdenum disulfide, and silicon dioxide.

7. The gramophone record as claimed in claim 1, further comprising a conductive layer formed between said buffer layer and said cladding layer, said conductive layer being made of a material selected from the group consisting of nickel, vanadium, titanium, molybdenum, chromium, copper, aluminum, gold, silver, platinum, and combinations thereof, with the proviso that said material of said conductive layer is different from said material of said buffer layer.

8. The gramophone record as claimed in claim 7, further comprising a protective layer formed on the surface of said cladding layer and opposite to said conductive layer, said protective layer being made of a fluorine-containing compound or silicon dioxide nanoparticles.

9. The gramophone record as claimed in claim 4, further comprising a protective layer formed on the surface of said cladding layer and opposite to said main body, said protective layer being made of a fluorine-containing compound or silicon dioxide nanoparticles.

10. The gramophone record as claimed in claim 2, wherein said cladding layer has a static friction coefficient of not greater than 1, using stainless steel as a reference surface.

11. The gramophone record as claimed in claim 2, wherein said cladding layer has a Young's modulus between 1.05 and 3 times that of said main body.

12. The gramophone record as claimed in claim 1, wherein said main body is made from a material selected from the group consisting of polyvinyl chloride (PVC), polycarbonate (PC), polyetheretherketone (PEEK), polyimide (PI), polyoxymethylene (POM), and combinations thereof.

13. A gramophone record, comprising:
a main body made of a polymeric material, and having a base surface, and an extending surface extending downward from said base surface, said extending surface defining a spiral groove in said main body; and
a cladding layer formed on said base surface and said extending surface and having a Hardness Rockwell C (HRC) of not less than 37;
wherein said cladding layer is made of an alloy of a metal selected from the group consisting of nickel, vanadium, titanium, molybdenum, chromium, tungsten, tantalum, and aluminum, the atomic percentage of said metal present in said alloy being not less than 50%.

14. A gramophone record, comprising:
a main body made of a polymeric material, and having a base surface, and an extending surface extending downward from said base surface, said extending surface defining a spiral groove in said main body;
a cladding layer formed on said base surface and said extending surface and having a Hardness Rockwell C (HRC) of not less than 37; and
a protective layer formed on the surface of said cladding layer and opposite to said main body, said protective layer being made of a fluorine-containing compound or silicon dioxide nanoparticles;
wherein said cladding layer is made of a material selected from the group consisting of a metal material, an alloy, a metal oxide, a metal nitride, and a metal carbide, and wherein
said metal material is selected from the group consisting of nickel, vanadium, titanium, molybdenum, chromium, tungsten, tantalum, aluminum, and combinations thereof,
said alloy is an alloy of a metal selected from the group consisting of nickel, vanadium, titanium, molybdenum, chromium, tungsten, tantalum, and aluminum,
said metal oxide is selected from the group consisting of indium oxide, tin oxide, zinc oxide, nickel oxide, vanadium oxide, titanium oxide, chromium oxide, tungsten oxide, tantalum oxide, and aluminum oxide,
said metal nitride is selected from the group consisting of nickel nitride, vanadium nitride, titanium nitride, chromium nitride, tungsten nitride, tantalum nitride, and aluminum nitride, and
said metal carbide is selected from the group consisting of nickel carbide, vanadium carbide, titanium carbide, chromium carbide, tungsten carbide, tantalum carbide, and aluminum carbide.

* * * * *